United States Patent [19]

Duffy et al.

[11] Patent Number: 4,782,850
[45] Date of Patent: Nov. 8, 1988

[54] TRAVEL STOP FOR DIAPHRAGM REGULATOR VALVE

[75] Inventors: John W. Duffy, Tama; Gregory P. Nichols, Marshalltown, both of Iowa

[73] Assignee: Fisher Controls International, Inc., Clayton, Mo.

[21] Appl. No.: 54,297

[22] Filed: May 26, 1987

[51] Int. Cl.⁴ .......................................... F16K 31/126
[52] U.S. Cl. ........................ 137/116.5; 137/505.11; 137/505.36; 137/505.46; 137/557
[58] Field of Search .......... 137/116.5, 505.11, 505.36, 137/505.46, 557

[56] References Cited

U.S. PATENT DOCUMENTS

| | | | |
|---|---|---|---|
| 2,705,955 | 4/1955 | Nesset et al. | 137/800 X |
| 2,869,575 | 1/1959 | Hutchens | 137/505.11 X |
| 3,705,599 | 12/1972 | Sheward | 137/505.11 X |
| 3,844,310 | 10/1974 | Brindisi | 137/557 |
| 4,168,723 | 9/1979 | Schneider | 137/557 X |

FOREIGN PATENT DOCUMENTS

482030 6/1953 Italy ................................ 137/505.46
583258 10/1958 Italy ................................ 137/116.5

Primary Examiner—Gerald A. Michalsky
Attorney, Agent, or Firm—Nicholas A. Camasto; Arnold H. Cole; Dale A. Kubly

[57] ABSTRACT

A diaphragm type regulator valve includes a pusher post with outwardly extending stop ears coupled to the diaphragm. The linkage coupling the pusher post and valve disc includes a lever having a pair of legs that engage a pin in a bifurcated portion of the pusher post for transmitting forces between the diaphragm and the valve disc. A retainer is rigidly mounted to the valve casing and pivotally supports the lever. The retainer includes a pair of stops that straddle the pusher post and extend in the path of travel of the stop ears thereon for positively restraining travel of the pusher post beyond a predetermined point should an excess pressure condition exist. Restraining travel of the pusher post prevents excessive stress on the linkage. A one piece plastic pressure relieve indicator mechanism is also disclosed.

9 Claims, 5 Drawing Sheets

TRAVEL STOP FOR DIAPHRAGM REGULATOR VALVE

CROSS REFERENCE TO RELATED APPLICATIONS

This application discloses apparatus described in copending U.S. application Ser. No. 054,371, filed May 26, 1987 now U.S. Pat. No. 4,754,778, entitled Velocity Boost Body With Wrap-Around Pitot Tube in the name of John Duffy and Dennis Sickels, which application is assigned to Fisher Controls International, Inc. and incorporated by reference herein.

BACKGROUND OF THE INVENTION AND PRIOR ART

This invention relates generally to gas pressure diaphragm regulator valves and particularly to gas pressure diaphragm regulator valves that include a built in pressure relief mechanism.

Gas pressure regulator valves are well known in the art. In such valves, a valve disc or plug and a seat assembly are positioned intermediate an upstream and a downstream portion of a flowpath for controlling downstream pressure and flow by varying the valve opening, that is, the amount by which the disc is displaced from its valve seat. Pressure and flow regulation are achieved by modulating the valve opening to develop the downstream pressure required to deliver the flow demanded by the load. A popular form of regulating valve includes a diaphragm, that acts as both a measuring and a loading device, with the downstream pressure being applied to one side of the diaphragm against the force of an opposed adjustable spring. In the specific type of valve to which the invention is directed, the upstream pressure applies an opening force against the valve disc. The opening force is applied through a stem and linkage mechanism to a pusher post that is in communication with the diaphragm and the regulator spring. The lower downstream pressure applies an opposing force, directly to the diaphragm, that tends to close the valve. The linkage mechanism has a mechanical disadvantage that enables the downstream pressure to offset the force of the regulator spring, which enables regulation.

Valves of this type often incorporate a pitot tube for applying the pressure at the vena contracta to the diaphragm. At the vena contracta, which is generally located a short distance downstream of the actual valve opening, the flow velocity is at a peak and the pressure is at a minimum. The low pressure provides a so-called "velocity boost" due to the reduced pressure applied to the diaphragm and yields well-known operating advantages.

In a pipeline installation, there is always the possibility of a sudden increase in pressure that can pose significant problems for the regulating mechanisms coupled to the line. In a pressure relief diaphragm type regulator, means are provided for rapidly increasing the pressure on the diaphragm to close the valve and protect the load equipment connected to the downstream side. In many installations the regulating valves are not "pressure relieved", but some other mechanism is placed in the pipeline to protect against abnormal pressure increases. As those skilled in the art know, the regulating valve itself can be damaged or even destroyed by the force applied to the diaphragm as a result of a large increase in downstream pressure. Even in pressure relief type diaphragm regulator valves which include a mechanism to relieve the increased downstream pressure, the linkage may be stressed to the point of damage or destruction.

Prior art diaphragm regulator valves include means for limiting the movement of the mechanical linkage that couples the valve plug to the pusher post. The mechanical linkage generally consists of a sheet metal lever, a valve stem and one or more pins, legs and cams for translating motion of the valve stem, which is attached to the valve disc holder, to the pusher post. Linkage movement is halted at a certain point by contact with a rigid stop. The resulting stress on the linkage under these conditions may be considerable and damage or destruction can result.

In diaphragm type regulator valves with built in pressure relief mechanisms, the pusher post and diaphragm are coupled by means of a locking spring which keeps the diaphragm and pusher post in engagement. Under normal pressure conditions, the linkage engages a stop in the lower casing of the valve that prevents the pusher post from traveling beyond a predetermined point. The diaphragm can, however, continue moving against the combined actions of the regulator spring and the locking spring and open a passageway from the lower casing, through the diaphragm structure, to the upper casing, for venting of the excess pressure. As mentioned, the construction has inherent disadvantages, both from a mechanical tolerance point of view and from an operating point of view since the valve stem, lever and connecting pins can easily be damaged during an over pressure condition. It is also important to provide some means for maintenance personnel to determine that an over pressure condition has occurred. It is thus common in the art to provide some form of pressure relief indicator mechanism for visually indicating the occurrence of an increased pressure condition.

One form of prior art pressure relief indicator utilizes a brightly colored indicator ball. The ball is mounted to a small shaft that is secured in the vent opening of a valve by means of a rubber grommet that is fitted to a metal stamping which is pressed, or otherwise secured, in the vent opening. The grommet frictional forces on the stem of the indicator ball mechanism keeps the ball inside the vent against the force of a very light spring. The metal stamping has an opening for relieving pressure inside the spring casing to the atmosphere. Upon operation of the relief mechanism, the relief gas flowing through the opening in the stamping exerts pressure on the ball and drives it out of the vent where it is visible to maintenance personnel. The light conical spring keeps the ball in its outward position to indicate that a pressure relief operation has occurred. The stem has a slightly enlarged end to prevent its withdrawal from the grommet under normal relief operating conditions. Under high pressure conditions, however, the stem may pull through the grommet, resulting in the discharge of the ball and stem mechanism as a projectile. This not only presents a danger from the flying objects, but it negates the function of signalling occurrence of a pressure relief operation. Also the mechanism involves a number of parts that require assembly and is complex and relatively expensive.

Accordingly, there is a need for a diaphragm type regulator valve and a pressure relief indicator that solve these problems of the prior art.

OBJECTS OF THE INVENTION

A principal object of the invention is to provide an improved diaphragm type regulator valve.

Another object of the invention is to provide a diaphragm type regulator valve that is more reliable.

A further object of the invention is to provide an improved pressure relief diaphragm regulator valve.

Still another object of the invention is to provide a novel pressure relief indicator for a regulator valve.

A still further object of the invention is to provide a pressure relief indicator for a regulator valve that is simple in construction and reliable in operation.

Yet another object of the invention is to provide a one piece pressure relief indicator for a regulator valve.

BRIEF DESCRIPTION OF THE DRAWINGS

Further objects and advantages of the invention will be apparent upon reading the following description in conjunction with the drawings in which.

DESCRIPTION OF THE PREFERRED EMBODIMENT

Figure 1:
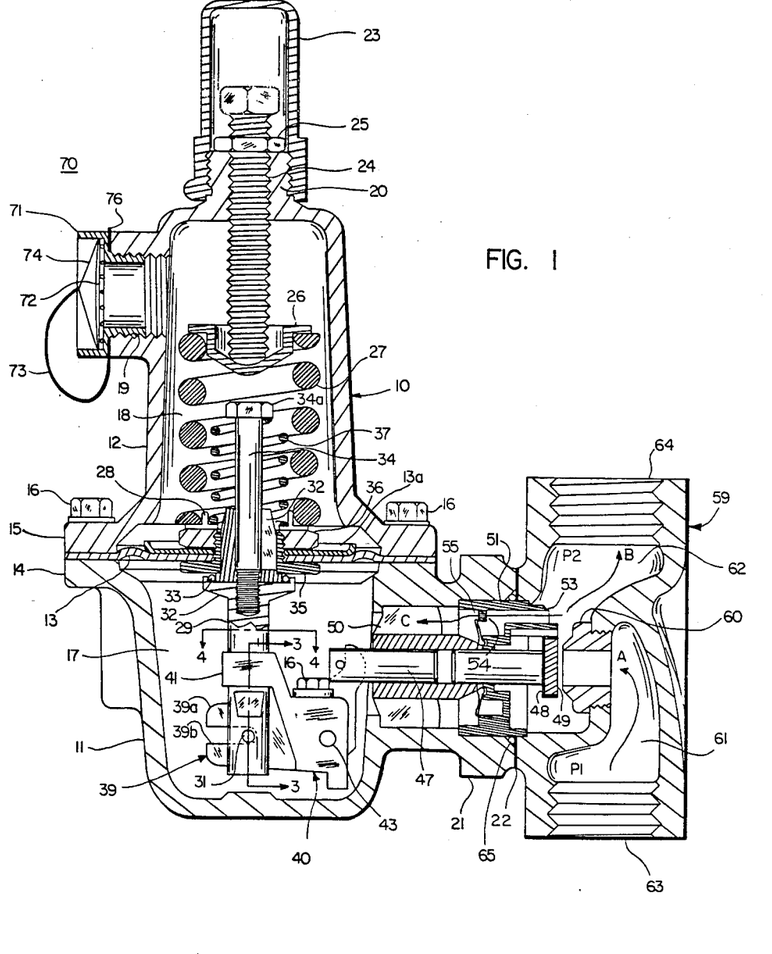
FIG. 1 is a sectional view of a diaphragm type pressure relief regulator valve constructed in accordance with the invention.

Referring to FIG. 1, a regulator valve 10 includes a lower casing 11 and an upper or spring casing 12 that are separated by a generally flat circular elastomeric diaphragm 13. The valve casings are preferably cast of metal and machined where required. It should be understood that the valve and diaphragm construction per se are not part of the invention and, consequently, they will not be described in detail. The diaphragm is maintained in position between casings 11 and 12 by means of flanges 14 and 15 and bolts 16. This arrangement provides a lower chamber 17, formed by the underside of the diaphragm and lower casing 11, and an upper chamber 18, formed by the upper side of the diaphragm and spring casing 12.

An interiorly threaded vent 19 and an interiorly and exteriorly threaded post 20 are formed in the upper part of spring casing 12. Lower casing 17 extends into a flange 21, at right angles to flanges 14 and 15, that forms a seal edge 22 for engagement with a body casting 59. Body casting 59 supports a valve seat therein and in coordination with the lower casing 17 supports a valve disc, a velocity boost body and an operating stem for the valve disc. Body casting 59 also includes suitable end means for connecting the regulator valve in a pipeline.

An elongated cup-shaped cap 23 is closed at one end and includes thread means for threadingly engaging the exterior threads of post 20 to provide access for adjustment of the regulator mechanism. Cap 23 is removable to permit regulator adjustments and may include suitable gasket means for making a relatively pressure tight seal when the cap is in position. An adjusting screw 24 threadingly engages the interior threads of post 20 and is secured in its adjusted position by means of a locknut 25 engaging the outer flat surface of post 20. One end of adjusting screw 24 forms a head to facilitate rotation of the screw by means of a suitable tool and the other end bears against an inverted, dome-shaped, upper spring seat 26. Spring seat 26 bears against the ground end of a compression spring 27, the other ground end of which engages a lower spring seat 28. Compression spring 27 functions to provide an adjustable closing force to the valve disc for controlling downstream flow conditions in a well known manner. As will be described, diaphragm 13 is positioned between lower spring seat 28 and the enlarged upper surface of a cylindrically shaped pusher post 29.

Figure 2:
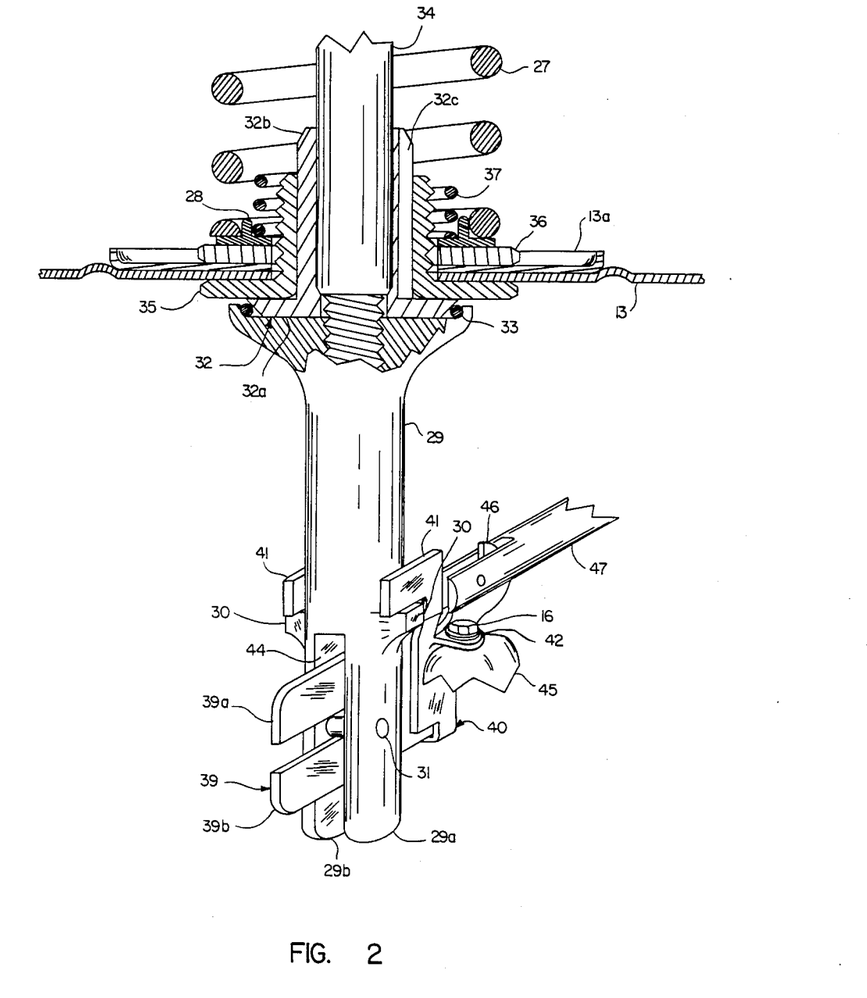
FIG. 2 is a partial perspective view showing the relief mechanism, pusher post, lever and retainer of the valve of FIG. 1.

As best seen in FIG. 2, in conjunction with FIG. 1, the lower end of pusher post 29 is bifurcated to form a pair of legs 29a and 29b and includes a pair of outwardly extending, integrally formed stop ears 30. A horizontally disposed drive pin 31 bridges legs 29a and 29b at an intermediate point and, as will be seen, is engaged by the legs of a lever for coupling forces between the valve disc and the pusher post.

A three-legged guide 32 has a circular portion 32a that rests against the top of pusher post 29 and legs 32b, 32c and 32d (the latter not visible in the drawings) having surfaces that lie on inner and outer cylindrical surfaces. A cap-shaped connector 35 and a mating nut 36 are threadingly engaged to clamp the central portion of diaphragm 13 and a rigid diaphragm head 13a therebetween. The lower portion of spring seat 28 abuts against nut 36. Connector 35, nut 36, diaphragm 13 and diaphragm head 13a are axially movable, up and down along the outer cylindrical surface formed by the legs of guide 32 against the forces exerted on lower spring seat 28. In so doing, an O-ring 33, which is normally compressed between the top surface of pusher post 29 and the bottom surface of connector 35, breaks its seal to establish passageways from lower chamber 17 to spring chamber 18 through the spaces defined between the legs 32b, 32c and 32d of guide 32. A cylindrical guide retainer 34 is threaded at one end for centrally engaging the top of pusher post 29 and includes a shoulder for securing guide 32 to pusher post 29. Retainer 34 also includes a head 34a that engages an appropriately formed end of a locking spring 37 that is also seated against lower spring seat 28. Locking spring 37 prevents vibration from loosening guide retainer 34. Thus the entire diaphragm assembly urges pusher post 29 in a downward direction due to the force exerted by regulator spring 27 and locking spring 37.

A flat, generally L-shaped, lever 39 includes a pair of legs 39a and 39b extending in the slot formed in pusher post 29, by legs 29a and 29b, and straddling pin 31. The lever is mounted for movement about a pin 43 that is supported in a retainer 40. Retainer 40 is firmly secured to a pair of support posts 45, formed in lower casing 11, by means of outwardly extending mounting brackets 42 and nuts 16. Retainer 40 also includes a pair of stops 41 which straddle pusher post 29 and extend over stop ears 30. The other end of lever 39 forms a cam 46 that is captured in a slot formed by a pin and a shoulder on a movable cylindrical stem 47 that is connected at its other end to a valve disc holder 48 which supports a valve disc 49. This arrangement translates axial movement of stem 47 into 90 degrees-displaced axial movement of pusher post 29 and vice versa.

A stem guide 50 has a cruciform-shaped exterior and a cylindrical interior that is journalled to support cylindrical stem 47 for axial movement. The exterior configuration of the stem guide permits flow thereover as indicated by the arrow labelled C. A pair of circumferential grooves are formed in the stem and, in cooperation with a pair of O-rings, provide a pressure seal between stem 47 and stem guide 50. Lower casing 11 includes an annular lip for captivating stem guide 50 when a velocity boost body 51 is mounted in position. Boost body 51 includes a small registration orifice 54 to enable the pressure at the vena contracta in the flowpath to be communicated to lower chamber 17 and applied to the lower surface of diaphragm 13. Sampling is accomplished by means of a wrap-around Pitot tube 53 that extends from velocity boost body 51 to an area adjacent to the downstream side of the valve disc 49. Velocity boost body 51 also includes a resilient flapper 55 that normally seals a large annular relief orifice formed in the boost body. The particular velocity boost body with the wrap-around pitot tube is the subject of copending application Ser. No. 54,371, now U.S. Pat. No. 4,754,778, and reference to that application should be made for details of its construction and operation. Suffice it to say that, in the face of a rapid increase in downstream pressure P2, flapper 55 uncovers the relief orifice to open a large communicating passage between body casting 59 and lower chamber 17 for rapidly affecting diaphragm 15.

As mentioned, body casting 59 supports an annular valve seat 60. The body casting is partitioned into an upstream chamber 61 and a downstream chamber 62, with a suitable inlet fitting 63 and outlet fitting 64 for connection into a pipeline. Valve seat 60 and valve disc 49 separate the two chambers. An O-ring 65 is provided for making a pressure seal between body casting 59, seal edge 22 and velocity boost body 51 when body casting 59 is bolted to lower casing 11 by means of conventional bolting (not shown). The arrows labelled A and B indicate the direction of flow in the flowpath, from pressure P1 to pressure P2, through valve seat 60.

Figure 3:
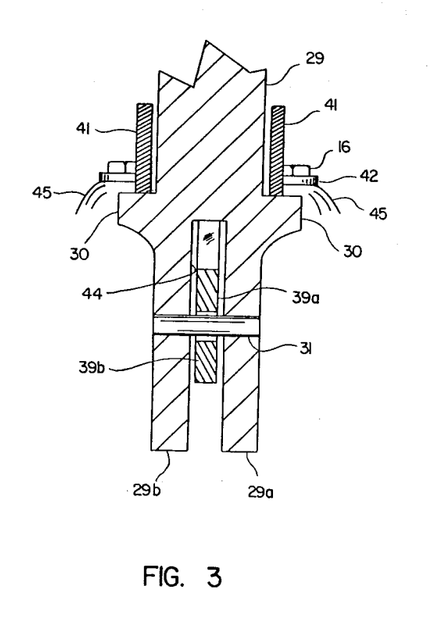
FIG. 3 is a partial sectional view taken along the line 3—3 of FIG. 1.
Figure 4:
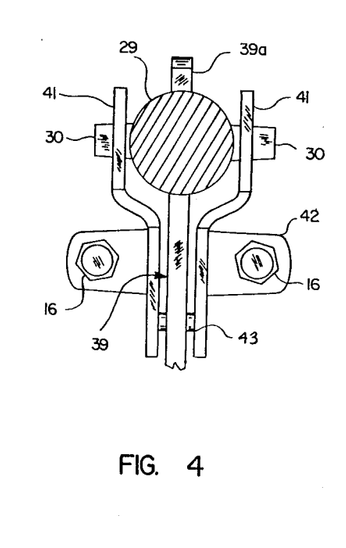
FIG. 4 is a partial sectional view taken along the line 4—4 of FIG. 1.

Reference to FIGS. 3 and 4, which are partial sectional views through the pusher post more clearly shows the configuration and disposition of retainer 40. Retainer 40 is preferably fabricated of a single piece of stock sheet metal that is stamped, bent and folded upon itself into the configuration indicated. Mounting brackets 42 are securely fixed by means of bolts 16 to the lower casing mounting posts 45. Stops 41 overlie the pusher post stop ears 30 and positively limit movement of the pusher post, in the event of an excess pressure condition in lower chamber 17, to protect the relatively fragile parts of the linkage mechanism, namely lever 39 and pins 31 and 43.

In accordance with another aspect of the invention, a pressure relief indicator mechanism 70 includes a brightly colored indicator 74 that is mounted in a cylindrical retainer 71 fittingly engaged, by any suitable means, in vent 19 of spring casing 12. As shown, cylindrical retainer 71 is retained by means of threaded surfaces which mate with the interior threaded surface of vent 19. A screen 72 is mounted in the opening of retainer 71 to keep foreign materials from entering spring casing 12. Under normal conditions the opening is covered by indicator 74 and the screen is required only when a pressure relief operation has occurred. A flexible strap 73 attaches indicator mechanism 70 to spring casing 12 by means of a retaining means comprising an annular portion 76 captivated between an external shoulder on retainer 71 and the end surface of vent 19. In the event of a pressure relief operation, relief indicator 74 is "blown out" of retainer 71 and hangs outside the relief valve as a flag to indicate that a relief operation has occurred.

Figure 5:
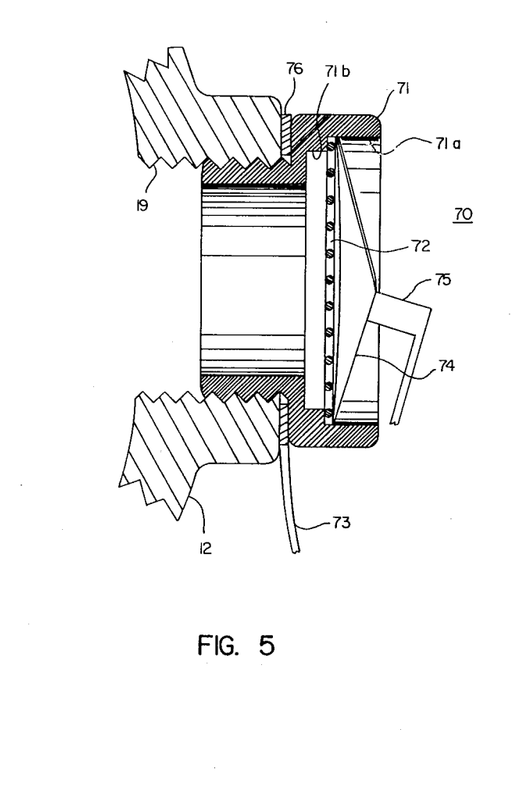
FIG. 5 is an enlarged partial sectional view of a pressure relief indicator constructed in accordance with another aspect of the invention.
Figure 6:
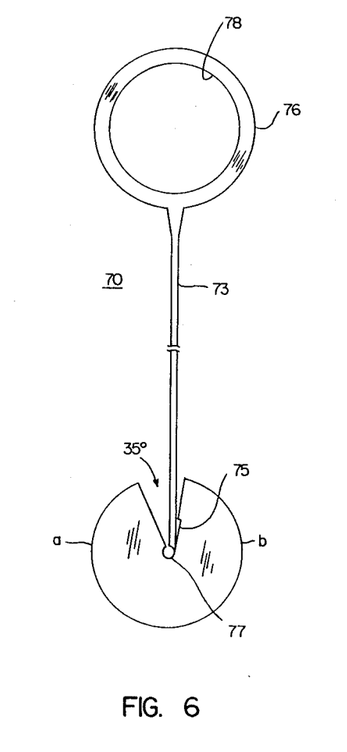
FIG. 6 is a plan view of the pressure relief indicator of FIG. 5.
Figure 7:
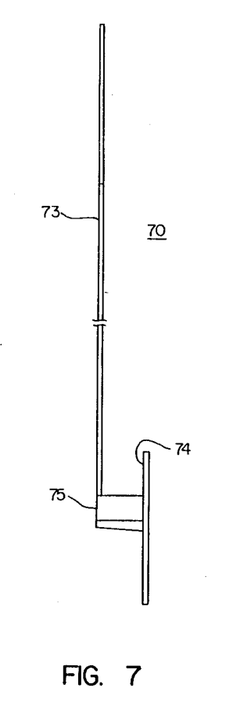
FIG. 7 is an elevation view of the pressure relief indicator of FIG. 6.

FIGS. 5, 6 and 7 will help to illustrate the construction of the indicator mechanism 70, which, as mentioned, is preferably made of a single piece of plastic material. It has a generally dumbbell-type configuration with annular portion 76 having an inner diameter 78 sized to be captivated between retainer 71 and vent 19, as best illustrated in FIG. 5. The shoulder on retainer 71 retains the indicator securely to the upper spring casing of the regulator valve. The other end of strap 73 extends into an offset shoulder portion 75 that flows into indicator 74 which lies in a plane extending generally parallel to the plane of strap 73. Indicator 74 is in the form of a disc with a pie-shaped wedge removed. A small aperture 77 is formed at the center of indicator 74 and the pie-shaped wedge covers about 35 degrees. Retainer 71 has stepped internal diameters 71a and 71b which form a ledge for retention thereat of screen 72. The screen may be permanently attached thereto by sonic welding and the entire arrangement of retainer, screen and indicator mechanism may be fabricated of plastic.

The planar diameter of indicator 74 is greater than the internal diameter 71a. When indicator 74 is points "a" and "b" on the disc to force the cut-out ends into overlapping relationship, its diameter is reduced sufficiently to enable it to be inserted into the retainer and into position against screen 72. When released, the resilience of the disc material results in its forming a snug fit within the retainer. While the seal formed by disc 74 is not perfect, it does impede flow sufficiently, such that in the even of a rapid pressure build-up within spring chamber 12, the indicator is forced out of retainer 71. When that occurs, the indicator hangs down from the valve, but remains attached thereto because of strap 73 and annular portion 76. Thus brightly colored indicator 74 hanging from the vent of the regulator valve visually indicates that an over pressure condition has occurred.

The shape of indicator 74 and the provision of shoulder 75 are important aspects. The conical shape which the flat disc of indicator 74 takes when in operating position assists in forcing it out of the vent during an over pressure condition. There is little possibility of it "hanging up" in the vent. Shoulder 75, which stands off from disc 74, facilitates manipulation of the flat disc into the conical shape required for insertion of the indicator into position within retainer 71. Also, as best seen in FIG. 5, shoulder 75 projects out of retainer 71 to provide a leverage point for forcing the disc into its conical shape. In practice the indicator is partially inserted into the opening of retainer 71 with the point "a" engaging the inner wall of the opening. Thereafter, simple thumb pressure on shoulder 75 in the direction of "a" forces indicator 74 to assume its conical shape, reducing its diameter and enabling it to be fully inserted into the opening of retainer 71. Release of the pressure on shoulder 75 results in the indicator enlarging its diameter and locking itself within the opening of retainer 71. Thus, insertion of the indicator into the vent is a simple and straightforward operation.

Figure 8:
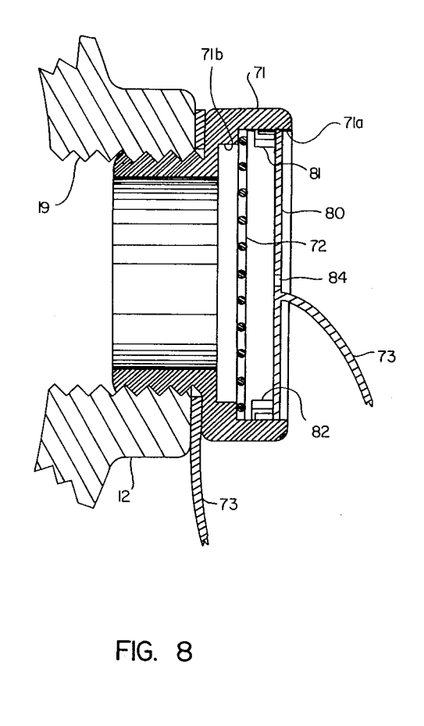
FIG. 8 is an enlarged partial sectional view of another form of pressure relief indicator.
Figure 9:
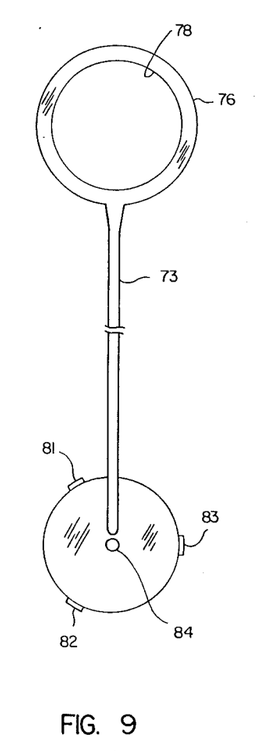
FIG. 9 is a plan view of the indicator of FIG. 8.
Figure 10:
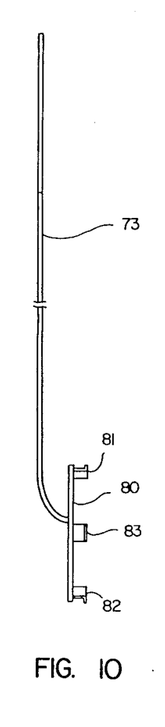
FIG. 10 is an elevation view of the indicator of FIG. 9.

In FIGS. 8, 9 and 10, another form of indicator mechanism invention is shown in which an indicator disc 80 has three depending feet 81, 82 and 83 which extend beyond the circumference of the disc. A strap 73 is affixed near the center of the disc, and in other respects, the disc functions in the same manner as disc 70 in FIGS. 5, 6 and 7. A small central aperture 84 assists in normal venting. Disc 80 is inserted by pressing it into retainer 71. In so doing, the depending legs 81-83 are inwardly deflected and exert outward forces to keep disc 80 seated within retainer 71. In the event of an overpressure condition occurring, disc 80 is blown out of retainer 71 and hangs down from the valve, supported by strap 73 to visually indicate the condition.

With the construction of the indicator mechanisms of the invention, not only is the cost very low since they are made of simple plastic, but they are very easy to install, effective in operation and failsafe. With them, the prior art danger of a projecting missile in the event of an overpressure condition, is eliminated. Also, there is no possibility of the indicator being blown free of the regulating valve and failing to visually indicate occurrence of an over pressure condition.

Reverting to FIGS. 1-4, in operation, adjusting screw 24 is rotated to establish the pressure exerted by regulating spring 27 against diaphragm 13 and pusher post 29. Through pin 31, legs 39a and 39b of lever 39 and stem 47, pusher post 29 exerts a force tending to close the valve, that is, force valve disc 49 into contact with valve seat 60. Under any given condition of flow, a pressure P1 exists in upper chamber 61 of the body casting. Movement of valve disc 49 away from valve seat 60 establishes a lower pressure P2 in downstream chamber 62. Pressure P2 (or in the embodiment shown, the pressure at the vena contracta, which is less than P2) is conveyed through registration orifice 54 in velocity boost body 51 to lower chamber 17 and acts against the lower surface of diaphragm 13. Because of the mechanical disadvantage of lever 39 and the relatively small surface area of valve disc 49 in comparison with the surface area of diaphragm 13, the pressure on the underside of the diaphragm is able to overcome the effect of the weight of the regulating mechanism and the forces exerted by regulating spring 27 and locking spring 37. Thus, for a given flow volume downstream, the pressure P2 can be stabilized by action of diaphragm 13, pusher post 29 and the linkage which adjust the amount by which valve disc 49 moves away from valve seat 60. This regulating action is well known in the art and forms no part of the present invention.

In the event of a rapid increase in downstream pressure P2 due, for example, to a rapid increase in upstream pressure P1, flapper 55 opens to enlarge the passage between the downstream chamber 62 and lower casing 11. Thus the increased pressure is rapidly applied to the underside of diaphragm 13 and forces it in an upward direction, lifting pusher post 29 as it moves. Through pin 31, legs 39a of lever 39, cam 46 and stem 47, valve disc 49 is closed tightly against valve seat 60 to protect the downstream side from the excessive pressure. Even so, the force exerted on the underside of the diaphragm may be sufficiently high to deform or fracture portions of lever 39, and the pins in the pusher post, retainer and stem. Stop ears 30 on pusher post 29 prevent this by being moved into contact with the lower surfaces of stops 41 on retainer 40. Thus, pusher post 29 is stopped in its upward travel.

In a pressure relief vale, such as that shown, diaphragm 13 may continue to move upward when the pusher post is stopped, forcing connector 35 to further compress regulating spring 27 and locking spring 37. In so doing connector 35 breaks the seal formed by O-ring 33 and opens passageways formed by the separated guide legs 32b, 32c and 32d between lower casing 17 and spring casing 12. As mentioned above, the pressure increase in spring casing 12 causes the indicator 70 to "blow out" of retainer 71 and the pressure in spring casing 12 is relieved. The pressure increase is prevented from overstressing the lever and linkage mechanisms since retainer 40, which is firmly secured by means of mounting brackets 42 to the support posts 45 in lower casing 11, restricts the pusher post travel.

What has been described is a novel stop arrangement for a diaphragm regulator valve. It is recognized that numerous changes in the described embodiment of the invention will be apparent to those skilled in the art without departing from its true spirit and scope. The invention is to limited only as defined in the claims.

We claim:

1. A diaphragm type regulator valve including a first and a second casing and an elastomeric diaphragm separating said casings;

a pusher post in said first casing and operatively coupled to one side of said diaphragm for travel therewith;

valve means for regulating flow in a flowpath, said valve means comprising a movable valve disc and linkage means coupling said valve disc to said pusher post, said linkage means comprising an axially movable valve stem connected to said valve disc and a pivotably mounted flat, sheet metal lever coupling said valve stem and said pusher post for transmitting forces between said diaphragm and said valve disc, both said pusher post and said lever having bifurcated portions forming legs, the legs of said lever extending between the legs of said pusher post, and further including a pin joining the legs of said pusher post and operatively engaging the legs of said lever; and stop means mounted in said first casing for limiting the stress on said linkage means in the event of an excess pressure condition in said first casing, said stop means comprising a pair of stop ears on said pusher post and a retainer supporting said lever for pivotal movement and having stops blocking the travel path of said stop ears for positively restraining travel of said pusher post beyond a predetermined point.

2. The valve of claim 1 wherein said retainer includes pin means for pivotally supporting said lever and mounting means for firmly securing said retainer in said first casing and wherein said stops on said retainer straddle said pusher post and overlie said pair of stop ears.

3. The valve of claim 2 further including pressure relief means for establishing a passageway between said first and said second casings when travel of said pusher post is restrained by said stops.

4. The valve of claim 3, further including vent means in said second casing;

an indicator retainer defining a circular opening mounted in said vent means;

a one piece indicator mechanism having retaining means at one end, resilient indicator means at the other end and strap means interconnecting said retaining means and said resilient indicator means;

said retaining means cooperating with said retainer for securing said indicator mechanism to said valve; and said resilient indicator means including means for enabling positioning thereof within said circular opening of said retainer, whereat it is retained by the resilience of said indicator means.

5. The valve of claim 4 wherein said resilient indicator means defines a planar circular radially split disc that assumes a conical shape when mounted in said retainer.

6. The valve of claim 5 wherein said means enabling positioning of said indicator means includes a shoulder portion standing out of the plane of said disc for facilitating manipulation of said disc into said conical shape during insertion in said retainer.

7. The valve of claim 4 wherein said resilient indicator means defines a circular disc having a plurality of depending legs for enabling positioning thereof in said retainer.

8. The indicator of claim 7 wherein said depending legs are inwardly deflectable.

9. A diaphragm type regulator valve including an upper spring casing and a lower casing and an elastomeric diaphragm separating said casings;

a pusher post having an upper portion engaging the lower side of said diaphragm, a lower portion forming a pair of bifurcated legs and outwardly extending stop ears, said pusher post being located in said lower casing;

a valve assembly for regulating flow in a flowpath including a fixed valve seat and a movable valve disc;

linkage means including an axially movable valve stem connected to said valve disc and a lever coupling said valve stem and said pusher post;

said lever being fabricated of flat sheet metal and forming a pair of legs extending between the bifurcated legs of said pusher post;

said pusher post including a pin joining said bifurcated legs and extending between the legs of said lever; and a retainer rigidly mounted in said lower casing and including a pin supporting said lever for pivotal movement and a pair of stops straddling said pusher post and extending in the path of said stop ears for positively restraining travel of said pusher post beyond a predetermined point in the event of a pressure increase in said lower casing.

* * * * *

UNITED STATES PATENT AND TRADEMARK OFFICE
CERTIFICATE OF CORRECTION

PATENT NO. : 4,782,850

DATED : November 8, 1988

INVENTOR(S) : John W. Duffy & Gregory P. Nichols

It is certified that error appears in the above-identified patent and that said Letters Patent is hereby corrected as shown below:

Column 6, line 36, after "is", insert --formed into a conical-shape, by applying pressure to the--;

line 44, delete "even", insert --event--;

Column 8, line 4, delete "vale", insert --valve--.

Signed and Sealed this

Twenty-eighth Day of March, 1989

Attest:

DONALD J. QUIGG

*Attesting Officer*  *Commissioner of Patents and Trademarks*